United States Patent
Khawaja et al.

(10) Patent No.: US 10,917,442 B2
(45) Date of Patent: Feb. 9, 2021

(54) SYSTEM AND METHOD FOR SECURE BILLING FOR IMS-BASED VOIP NETWORKS

(71) Applicant: Saudi Arabian Oil Company, Dhahran (SA)

(72) Inventors: Kashif Khawaja, Dhahran (SA); Hulaiyel Khaldi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

(21) Appl. No.: 16/419,252

(22) Filed: May 22, 2019

(65) Prior Publication Data

US 2020/0374322 A1 Nov. 26, 2020

(51) Int. Cl.
*H04L 29/06* (2006.01)
*H04M 3/436* (2006.01)
*H04M 15/00* (2006.01)

(52) U.S. Cl.
CPC ...... *H04L 65/1016* (2013.01); *H04L 65/1006* (2013.01); *H04M 3/436* (2013.01); *H04M 15/66* (2013.01)

(58) Field of Classification Search
CPC ............ H04L 65/1016; H04L 65/1006; H04M 3/436; H04M 15/66
See application file for complete search history.

(56) References Cited

U.S. PATENT DOCUMENTS 8,401,022 B2 3/2013 Maes et al.
10,542,137 B1 * 1/2020 Sial ..................... H04L 65/1069
2003/0112936 A1 6/2003 Brown et al.
2007/0071221 A1 * 3/2007 Allen .................... H04L 61/157
  379/265.01
2007/0121596 A1 5/2007 Kurapati et al.
(Continued)

FOREIGN PATENT DOCUMENTS

WO      0106752 A1  1/2001
WO  WO 2007/002577 A1  1/2007

OTHER PUBLICATIONS

Giuhat, M. "IMS Security and Protection," Sipera Systems, 2010, p. 1-19.

(Continued)

*Primary Examiner* — Christopher M Brandt
(74) *Attorney, Agent, or Firm* — Leason Ellis LLP

(57) ABSTRACT

Methods and systems for independent security scrubbing and billing of calls through an IP Multimedia Core Network Subsystem (IMS) are provided. The system includes a core IMS network and a security network cloud securely connected via session border controllers. The IMS network is configured to route calls to the security network cloud. The security network includes call-processing and billing servers that implement security checks on calls from OSI model layer three to seven and analyze the call to collect and generate billing data. After successful security and billing operations, the call is routed back to the IMS network for handling according to conventional workflows. Accordingly, the disclosed invention serves to enhance security for IMS traffic, improve the accuracy of customer billing and conserves IMS network resources which would otherwise be consumed by malicious attacks and billing responsibilities.

18 Claims, 2 Drawing Sheets

(56) References Cited

U.S. PATENT DOCUMENTS

| | | | | |
|---|---|---|---|---|
| 2008/0175362 A1* | 7/2008 | Bangor | ................. | H04M 15/00 |
| | | | | 379/114.01 |
| 2010/0082557 A1* | 4/2010 | Gao | ....................... | H04L 63/20 |
| | | | | 707/694 |
| 2010/0158229 A1* | 6/2010 | Ku | ..................... | H04L 29/1216 |
| | | | | 379/201.01 |
| 2011/0113141 A1* | 5/2011 | Veenstra | ................ | H04L 63/20 |
| | | | | 709/226 |
| 2014/0302814 A1 | 10/2014 | Roncoroni et al. | | |
| 2017/0353608 A1* | 12/2017 | Li | ..................... | H04L 65/1006 |

OTHER PUBLICATIONS

Peng, C. et al., "Mobile Data Charging: New Attacks and Countermeasures," Department of Computer Science, University of California, CCS'12 Oct. 16-18, 2012, p. 1-10.
Peng, C. et al., "Real Threats to Your Data Bills: Security Loopholes and Defenses in Mobile Data Charging," CCS'14, Nov. 3-7, 2014, p. 727-738.
International Search Report and Written Opinion in Corresponding Patent Application No. PCT/US2020/032870 dated Jul. 16, 2020. 8 pages.

\* cited by examiner

SYSTEM AND METHOD FOR SECURE BILLING FOR IMS-BASED VOIP NETWORKS

FIELD OF THE DISCLOSURE

The present disclosure relates to network communications, and, more particularly, relates to a system and method for security scrubbing and secure billing of calls within an IP Multimedia Core Network Subsystem (IMS).

BACKGROUND OF THE DISCLOSURE

As is understood by those in the art and as set forth in the 3rd Generation Partnership Project (3GPP), IMS provides a common core network having an access-agnostic network architecture for converged networks. The IMS architecture was initially defined by the 3GPP to provide multimedia services to communication devices over an Internet Protocol (IP) network, as IP networks have become the most cost-effective bearer network to transmit video, voice, and data. IP Multimedia Core Network Subsystems (IMS) are known. Several 3GPP technical specifications describe online and offline charging for IMS networks, among other standardized features and functionality. IMS standards define functions concerning charging for calls handled by the network. IMS allows various predefined functions to implement a Charging Trigger Function (CTF) and to generate charging events which are sent to a Charging Data Function (CDF) over a Diameter based RF interface. The CDF uses this information to generate Charging Data Records (CDRs). These CDRs are eventually used in creating bills for users.

While IMS architecture is very extensive for prepaid and postpaid and offline/online charging, it does not address security measures for the modern IP networks where malicious attacks like TCP/IP and SIP D/DoS attacks are rampant. It can also be desirable for the IMS network to offload billing responsibilities to an external entity and impose security checks on the calls before any bills are generated.

It would therefore be advantageous to provide a method for enhancing the security for IMS traffic and improve the relevance and accuracy of bills as well by, inter alia, preventing malicious calls (or attempts) and by ensuring that charges for malicious calls are not reflected in customer bills. It is with respect to these and other considerations that the disclosure made herein is presented.

SUMMARY OF THE DISCLOSURE

Embodiments of the present disclosure provide a method for independent security verification and billing of calls in an IP Multimedia Core Network Subsystem (IMS). The method comprises the step of receiving an outbound call at a session-border controller (SBC) of an independent security network. The outbound call is received from the IMS network and is originating from a first terminal device of the IMS network and is directed to a second terminal device.

The method also includes forwarding the call to one or more security servers within the security network by the security network SBC. In addition, the one or more security servers perform the step of processing the call, which includes verifying the security of the call. Additionally, in response to verifying the security of the call, the method includes the step of generating billing data for the verified call using one or more billing servers within the security network. Furthermore, the method includes the step of forwarding the verified call back to the security network SBC by the one or more billing servers. Lastly, the method includes the step of the security network SBC transmitting the call to the IMS network for routing the call to the second terminal device.

According to another aspect, a system for independent security verification and billing of calls in an IP Multimedia Core Network Subsystem (IMS) is provided. The System comprises an independent security network cloud connected to the IMS network via a secure communication connection. In particular, the security network includes a session-border controller (SBC) configured to receive an outbound call, which originates from a first terminal device of the IMS network and is directed to a second terminal device. The network SBC is also configured to store one or more call parameters for the call and forward the call to one or more security servers within the security network.

The security network also includes one or more security servers configured to process the call to verify the security of the call and one or more billing servers configured to generate billing data for the verified call. The billing servers also are configured to forward the verified call back to the security network SBC which, in response to receipt of the verified call back from the one or more billing servers, is further configured to transmit the call to the IMS network for routing the call to the second terminal device.

These and other aspects, features, and advantages can be appreciated from the following description of certain embodiments of the disclosed invention and the accompanying drawing figures and claims.

DETAILED DESCRIPTION CERTAIN OF EMBODIMENTS OF THE DISCLOSURE

Disclosed herein are systems and methods for security scrubbing and billing of calls on an IP Multimedia Core Network Subsystem (IMS). The system can include a computing network cloud that is integrated with a core IMS network, which are well known in the art, and is configured to provide independent security scrubbing and billing of calls being handled by the IMS network. In particular, the IMS network can be configured to route calls that would otherwise be handled entirely by the IMS network to the security network cloud, which is configured to scrub the call for security and analyze the call to collect information necessary to generate billing data (e.g. CDRs). The exemplary embodiments can thus be used in situations in which it is desirable for an IMS network to offload billing responsibilities to an external entity and impose security checks on the calls handled by the network before any bills are generated. Accordingly, the disclosed system and methods are configured to not only enhance the security for IMS traffic but to also improve the relevance and accuracy of bills, in part, by preventing malicious calls (or attempts) and by ensuring that charges for malicious calls are not reflected in the customer bills.

Figure 1:
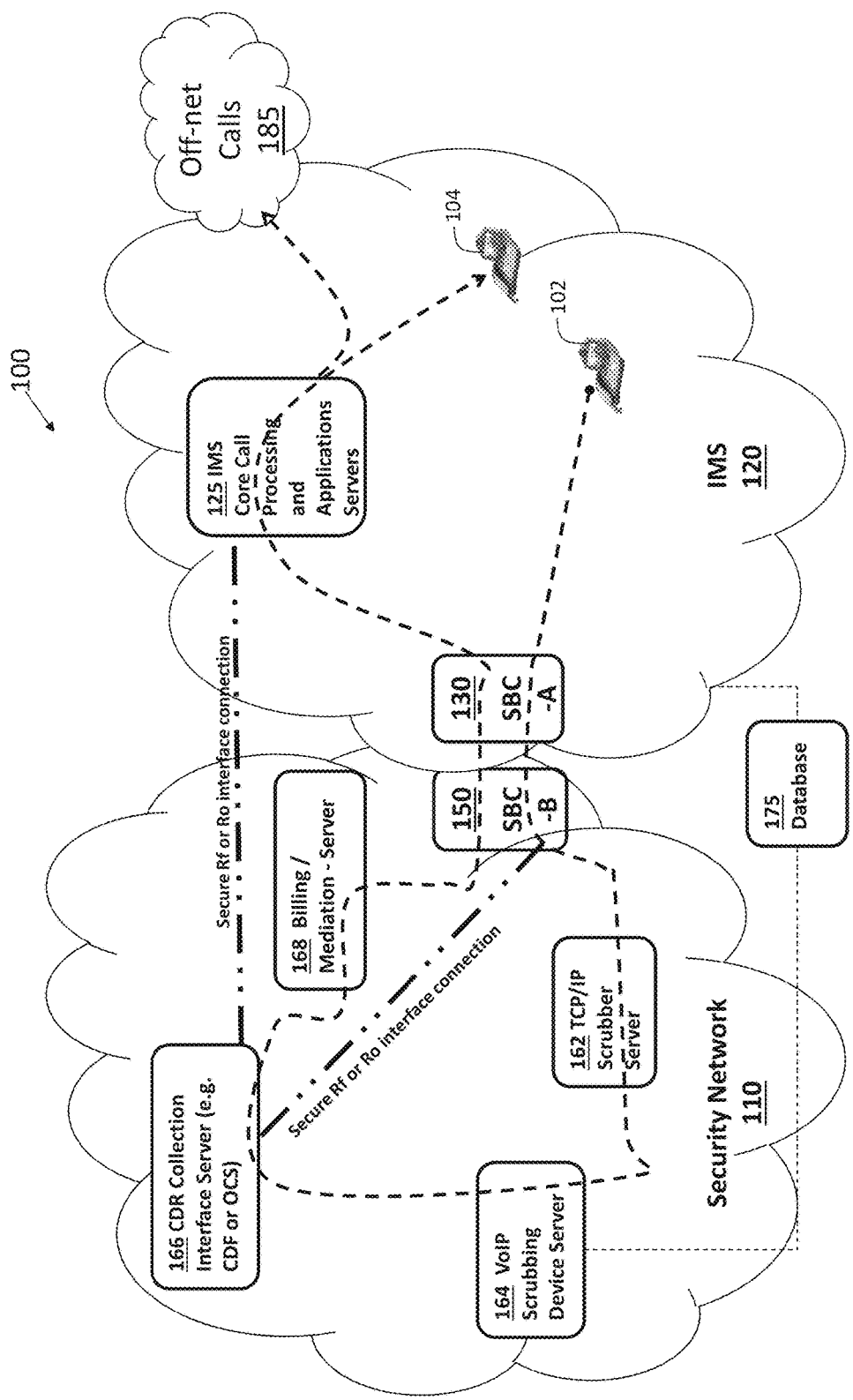
FIG. 1 is a schematic block diagram showing an IP (Internet Protocol) telephony system in which embodiments of the present disclosure can be employed.

FIG. 1 is a schematic block diagram showing an IP (Internet Protocol) telephony system 100 in which embodiments of the present disclosure can be employed. The system 100 includes an IP multimedia core network (IMS) 120 and an independent billing and security network 110. The system 100 also includes a first terminal device 102 and a second terminal device 104 that can be enabled for IP telephony communication, for example. The first and second terminal devices can be a digital telephone, mobile device such as a smart phone, an analog telephone coupled to a digital adapter, or in general, any computing device that includes components for transmitting and receiving data (e.g., voice calls or data) and communication with the IMS network 120 using TCP/IP protocol (e.g., transceivers, antennas, ports). For example, the first terminal device 102 generates signals based on user audio input which are then transmitted on an outbound path to the IMS network 120. The terminal devices are directly communicatively coupled to the IMS network 120. The access network between a terminal device and the IMS network may be a cellular network (e.g., CDMA or GSM), a WLAN (e.g., WiFi or WiMAX), an Ethernet network, or another type of wireless or wireline access network.

In the exemplary embodiments described herein, second terminal device 104 and first terminal device 102 are in communication via the IMS network 120 and, more specifically, the second terminal device 104 is the intended recipient of a call originating from the first terminal device 102. However, it should be understood that the IMS network 120 can provide IP telephony connectivity among a plurality of access networks. For example, in the system 100, the IMS 120 can also operate as the intermediary with outside networks, say, to facilitate off-net calls with outside call network 185.

Within the IMS network 120 is a session border controller ("first session border controller" or SBC-A) 130 that receives and processes communication requests from terminal devices that are coupled to the IMS network 120. The security network 110 also includes a session border controller ("second session border controller" or SBC-B) 150. The security network 110 and the IMS network 120 are thus communicatively coupled via the SBC-A 130 and the SBC-B 150. The first session border controller SBC-A 130 establishes, configures, maintains, and closes communication sessions between the IMS network 120 and the security network 110. Likewise, the second session border controller SBC-B 150 establishes, configures maintains, and closes communication sessions between the IMS network 120 and security network 110. In operation, the session border controllers control signaling and can also control the audio and other data streams that are transmitted between the security network 110 and the IMS network 120. For security, the SBC-A 130 is preferably placed at the edge of the IMS network 120. The connection between the SBC-A 130 and the security network 110 (e.g., via SBC-B 150) is also preferably encrypted.

The IMS network 120 can also include one or more call-processing and application servers 125 that are configured to process calls through the IMS 120 according to known standards and protocols, for instance, to direct communications toward target addresses for terminal devices. Although not shown, it should be understood that the IMS network 120 can include any number of additional servers for processing and directing communications through the IMS network 120. Moreover, while two terminal devices 102 and 104 are depicted within the system 100, it is to be understood that these devices are merely representative and that a larger number of devices can be connected and in communication via the IMS network 120.

According to the present disclosure, in different embodiments, the IMS network is configured to route all calls on the IMS network 120 to the security network 110, which is configured to scrub each call for security and analyze the calls to collect information necessary to generate billing data (e.g. CDRs). Accordingly, as shown in FIG. 1 and further described herein, the security network 110 can include one or more call-processing and application servers such as a TCP/IP scrubber server 162, a VoIP scrubbing device server 164, a CDR collection interface server (e.g., CDF or OCS) 166 and a billing/mediation server 168.

The extent of the security check performed on any given call can be executed by the security network 110 according to the requirements of the implementation, say, as prescribed by the administrators of the IMS 120 and the security network 110. In different embodiments, the security check can range from a basic check of TCP/IP (SYN attacks, etc.) to a deep inspection of the SIP headers/parameters to detect and eliminate TCP/IP and/or SIP D/DoS, Toll Frauds, and the like. Preferably, at a minimum, each call should be checked at the IP level to scrub for a suite of TCP/IP based D/DoS attempts and to ensure that the called and caller numbers are legitimate. Accordingly, in the exemplary configuration of system 100 shown FIG. 1, the security network 110 is preferably provided with access to a database 175 including at least the calling numbers (or prefixes) for the terminal devices connected to the IMS network 120.

Furthermore, the security network 110 can implement a billing component for the system that can be configured such that charges for a customer are only incurred if a call is legitimate. In addition, the security network 110 can be configured to drop any malicious IP or SIP attempt and log those calls for security analysis.

These security checks will provide the following exemplary benefits: Help conserve resources against malicious D/DoS attacks; Identify targets of D/DoS traffic; Create TCP/IP based security logs for analysis, troubleshooting and debugging; and improve the accuracy of billing for customers.

The session border controllers, IMS network servers and security network servers are computing devices having one more processing units (e.g., one or more microprocessors, digital signal processors (DSPs) and/or application-specific processing units) and memory devices (e.g., cache memory, main memory, flash memory or additional memory devices). In different embodiments, these devices can be programmed with executable instructions that configure the devices to implement the various security scrubbing, call routing and billing functions further described herein.

Figure 2:
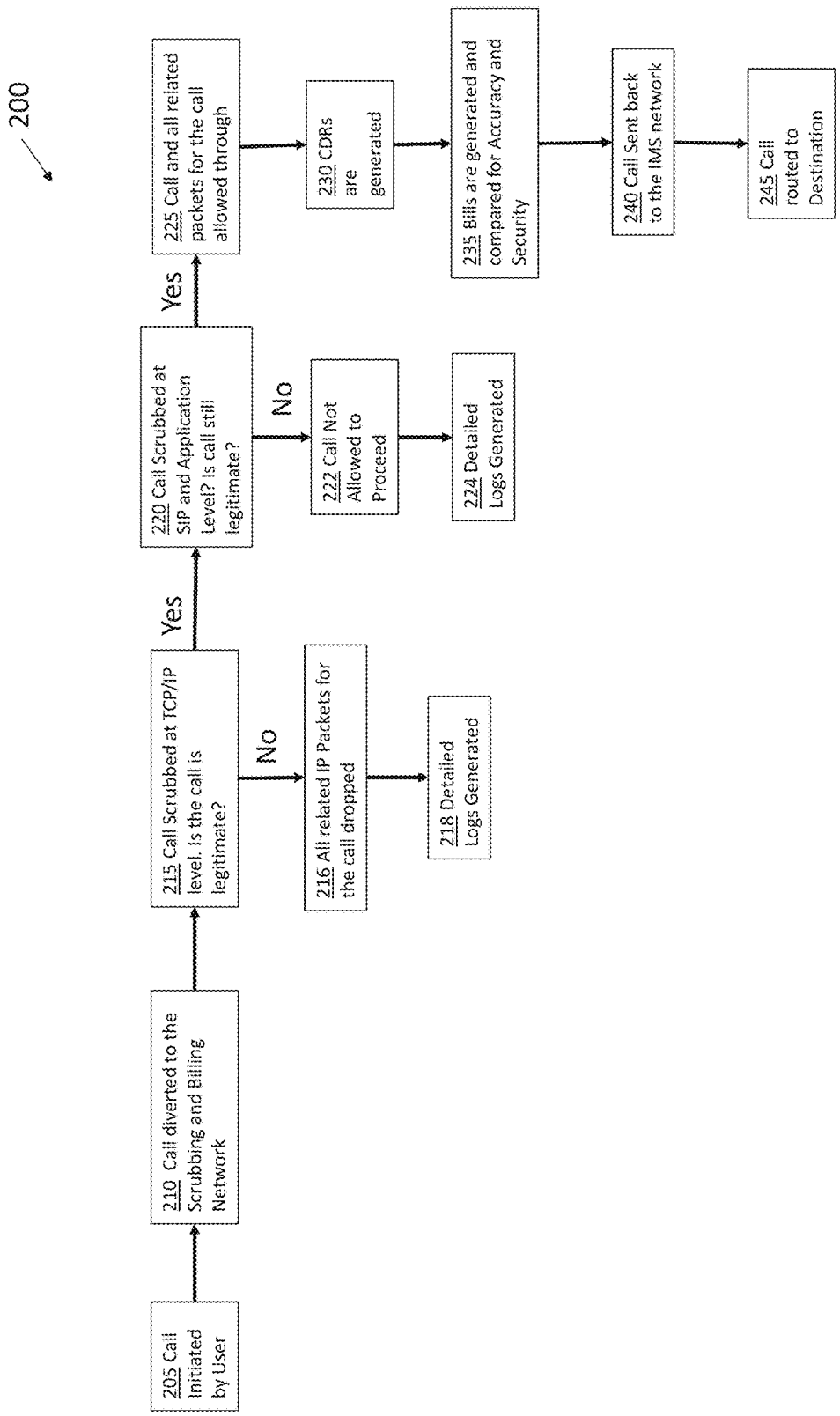
FIG. 2 is a flow chart of an embodiment method for security scrubbing and billing of a IMS network call according to the present disclosure.

FIG. 2 is a flow chart of a method of processing a call using the exemplary system 100 according to the present disclosure. FIG. 1 also illustrates the exemplary flow of information through the various components of system 100 in furtherance of processing the call. In particular, the exemplary flow of a call as it is handled by the various devices of IMS network 120 and security network 110 is shown in dashed lines. The exemplary flow of billing-related information, which is processed in connection with the call, is shown by the dash-dot-dot lines.

In a first step of the method, step 205, an outbound audio and signaling stream is transmitted from a first terminal device 102. At step 210, when the call is received by SBC-A 130, SBC-A 130 is configured to route the call for processing by the security network 110, particularly, by forwarding the call to SBC-B 150. As can be appreciated, the exemplary systems and methods serve to modify the normal operation of the IMS network because, instead of routing a call directly to the destination, the IMS network is configured to send all calls to the security network 110 first.

When a call traverses SBC-B 130, SBC-B 150 is configured to record one or more call parameters suitable for generating a CDR for the call. For instance, the SBC-B 150 can record the start (or stop) times in-line with any standard CDR collection methodology. The SBC-B 150 can also be configured to generate a CDR to be conveyed to the CDR Collection Interface Server 166 for further processing as described herein.

The SBC-B 150 can also be configured to forward the call on to the TCP/IP scrubber server 162. That server will, at step 215, perform checks on the call information against a defined database of IP-layer threat cases. If the TCP/IP scrubber server 162 determines the call to be a malicious call then, at step 216, it will drop the call based on, for example, the SIP Call-ID header. Also, at step 218, the TCP/IP scrubber server 162 can log, in storage, a record entry for the call. Generating a detailed log at step 218 can also include blacklisting the source IP. The decision to blacklist the source IP can be based on user defined threshold of number of offenses, for example.

Dropping the call at step 216 effectively prevents the VoIP scrubbing device server 164 from adding the call in the billing record for a customer associated with the call. As a result, the CDR collection interface server 166 will NOT generate a CDR for the call, because it will never see the call complete. Additionally, the call will not traverse the billing mediation server 168. Nor will the SBC-B 150 see this call return through it as a result of dropping the call. However, if at step 215 the TCP/IP scrubber server 162 determines the call to be legitimate traffic, it is configured to allow the call to continue to the VoIP scrubbing device server 164.

At step 220, the VoIP scrubbing device server 164 is configured to perform SIP level checks to further ensure that the call is legitimate. The SIP level checks can be predefined, for instance, by a user. VoIP scrubbing device server 164 will preferably have access to a database 175 in which the phone numbers (or prefixes) for the terminal devices serviced by the IMS network 130 are listed. In addition or alternatively, the VoIP scrubbing device server 164 can also have access to a worldwide numbering database for comprehensive checking.

If the VoIP scrubbing device server 164 deems the call as malicious (or unwanted), it will drop the call at step 222, for instance, based on key identifiers such as SIP Call-ID header. Similar to step 218, the VoIP scrubbing device server 164 can log an entry against a call at step 224 and possibly blacklist the phone number (e.g., based on user defined threshold of number of offenses). As a result of dropping the call at step 222, the CDR Collection Interface server 166 will NOT generate a CDR for the call because it will never see the call complete, the call will not traverse the billing mediation server 168, and the SBC-B 150 will also not see this call return through it.

However, if at step 220, the VoIP scrubbing device server 164 determines the call to be approved, the VoIP scrubbing device server 164 allows the call to proceed at step 225. Accordingly, at step 230, the CDR collection interface server 166 is configured to generate CDRs for the call.

As previously noted, when the call traversed SBC-B 150 it recorded the start and stop times (in-line with any standard CDR collection methodology) and can also generate a CDR to be conveyed to the CDR collection interface server 166. Accordingly, the CDR collection interface server 166 can perform step 230 by virtue of the call traversing through it and in view of the information received relating to the call from the SBC-B 150 and other security network servers. More specifically, in an exemplary configuration, the CDR collection interface server 166 can be configured to process the call based on one or more of three sets of CDRs: 1) CDR collection interface server 166 can be configured to receive CDRs directly from the IMS Core Call Processing and Application Servers 125 using standard IMS interface such as Rf and Ro; 2) CDR collection interface server 166 can be configured to receive CDRs from SBC-B 150; and 3) CDR collection interface server 166 can also be configured to generate CDRs as the call traverses through it. These sets of CDRs will allow the billing network 110 servers (e.g., CDR collection interface server 166 and/or billing mediation server 168, described next) to perform, among other things, a before-and-after comparison of records relating to the call for accuracy and security.

It should be understood that the CDR collection interface server 166 preferably is connected via virtual IP communication links to exchange billing data with the IMS network 120 servers (e.g., application servers 125). These links could be based on the IMS standard billing interfaces such as Rf and Ro. These links are preferably secured by suitable IP encryption and authentication methodology. Further, the CDR collection interface server 166 preferably is provided with similar links with the SBC(s) to collect the CDR information before any scrubbing analysis is performed as the call traffic enters the security network 110.

Subsequently, CDR collection interface server 166 can feed the call and any compiled charging information or CDR information to the billing and mediation system server 168. As a result, at step 235, the call can be added to customer's billing by the billing mediation server 168 based on the information received from the CDR collection interface server 166. In connection with step 235, the billing mediation server 168 can also generate and compare the customer's bills and validate them for accuracy and security based on the CDRs and related charging information compiled using the CDR collection interface server 166.

At step 240, the call is sent back to the IMS network 120 to be routed to its destination. More specifically, the call can be directed from the billing mediation server 168 to the SBC-B 150 to be further routed to the SBC-A 130 of the IMS network 120. The SBC-A 130 can, for example, route the call to the IMS Core call processing and application servers 125 for further processing and routing of the call to the destination in accordance with the conventional call processing protocols of the IMS network 120. For instance, as shown in FIG. 1, the call can be routed to the intended recipient, terminal device 104. By way of further example, if the call is directed to an off-network terminal device, the call can be routed to an outside network, say, network 185.

Although the security network 110 has been described as performing an exemplary set of security checks in connection with FIGS. 1 and 2, additional or alternative security checks can be performed on the calls. Preferably, the security network 110 is configured to implement a security check from OSI model layer three up through layer seven. The OSI model layers are well known and include: Layer 7—Application Layer; Layer 6—Presentation Layer; Layer 5—Session Layer; Layer 4—Transport Layer; Layer 3—Network Layer; Layer 2—Data Link Layer; Layer 1—Physical Layer. Put another way, implementing security checks within one or more of OSI model layers three through seven encompasses security checks on the application layer (similar to OSI layers 5-7) and the TCP/IP layer (similar to OSI layers 3-4), for example. Additionally, in response to successful security verification, the security network preferably generates a bill to be charged to users and does so in a separate network cloud than the one where the IMS network 120 resides.

It can be appreciated from the foregoing that through operation of the exemplary system 100 according to the exemplary method 200, each IMS-based SIP/RTP (or secure SIP and SRTP—the encrypted versions of the protocols) call is scrubbed at both TCP/IP and application level and subsequently bills are generated for charging users by the security network 110. The system 100 thus provides an infrastructure and process which combines the realms of TCP/IP and application layer security and handling of billing responsibilities. Integration with these features and functionality of the security network 110 effectively allows the IMS network 120 to devote its resources on call processing, rather than specializing in IP and VoIP security for billing accuracy. The independent security network also helps conserve IMS network resources (bandwidth, routing/switching processing power, memory, CPU of all devices involved in processing) which would otherwise be consumed by malicious attacks like TCP/IP and/or SIP/Telephony-based D/DoS attacks and prevents further offenses in case of malicious calls. Additionally, while performing all these security functions the billing can be scrutinized by the independent security network against the resulting CDR information generated post-scrubs at multiple points in the security verification process and by comparing it with the original CDR information generated by core network. The foregoing serves to minimize errors in customer billing. Moreover, because transfer of all information is encrypted between the independent security network and IMS network, the disclosed embodiments minimize the possibility of man-in-the-middle attacks.

It should be understood that various combination, alternatives and modifications of the present disclosure could be devised by those skilled in the art. The present disclosure is intended to embrace all such alternatives, modifications and variances that fall within the scope of the appended claims.

It should be understood that embodiments of the present disclosure may be implemented by software, by hardware, or by any combination of software and/or hardware as may be appropriate for specific applications or design requirements. In some embodiments, the system of the disclosure can further include general, multi-purpose and/or specific processors, circuits, logic systems, operators, circuitry, blocks, units and/or sub-units that can perform any operation, or any combination of operations, described above. In some embodiments of the disclosure, the system can further include memory units, buffers and/or registers for temporary and/or permanent storage of data. These units (e.g., processor and memory units), or any combination thereof, can be referred to herein as "circuitry," and can be internal and/or external to a communication node, in whole or in part. Accordingly, embodiments of the disclosure can include an article comprising a storage medium having stored thereon instruction that, when executed by a processing device, perform the steps of the exemplary power allocation algorithm for allocating transmission power at a communication node by, inter alia, multiplying one or more of a plurality of subcarriers by a calculated respective subcarrier weight, in accordance with the disclosed embodiments.

The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in an alternative order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be further appreciated that more or fewer operations can be performed than shown in the figures and described. It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It is to be understood that any structural and functional details disclosed herein are not to be interpreted as limiting the systems and methods, but rather are provided as a representative embodiment and/or arrangement for teaching one skilled in the art one or more ways to implement the systems and methods. Descriptions of well-known components, such as the IMS network infrastructure, and processing techniques may be omitted so as to not unnecessarily obscure the embodiments of the disclosure. It is to be further understood that like numerals in the drawings represent like elements through the several figures, and that not all components and/or steps described and illustrated with reference to the figures are required for all embodiments or arrangements.

While the invention which is the subject of the present disclosure has been particularly shown and described with reference to a preferred embodiment thereof, it will be understood by those skilled in the art that various changes in form and details may be made therein without departing from the spirit and scope of the invention. Therefore, the scope of the invention is indicated by the appended claims, rather than by the foregoing description. All changes that come within the meaning and range of equivalency of the claims are to be embraced within their scope.

What is claimed is:

1. A method for independent security verification and billing of calls in an IP Multimedia Core Network Subsystem (IMS), comprising:

receiving, at a session-border controller (SBC) of an independent security network from the IMS network, an outbound call originating from a first terminal device of the IMS network and being directed to a second terminal device;

forwarding, by the security network SBC, the call to one or more security servers within the security network;

processing the call using the one or more security servers, wherein processing of the call by the one or more security servers includes verifying the security of the call;

generating billing data for the verified call using one or more billing servers within the security network and in response to verifying the security of the call;

forwarding, by the one or more billing servers, the verified call back to the security network SBC; and transmitting, by the security network SBC, the call to the IMS network for routing the call to the second terminal device.

2. The method of claim 1, further comprising:

generating, by the security network SBC in response to receipt of the call from the IMS network, a first CDR for the call; and sending, by the security network SBC, the first CDR to a CDR collection interface server over a secure Rf or Ro interface.

3. The method of claim 1, wherein the one or more security servers verify the security of the call by implementing security checks within an IP network layer and an application layer for the call.

4. The method of claim 1, wherein processing the call using one or more security servers to verify the security of the call comprises:

analyzing, by a first security server, the call at an IP-layer against a defined database of IP-layer threat cases to determine whether the call is a malicious call; and analyzing the call by the second security server performing one or more of predefined SIP-level checks and a comparison of a caller number and a callee number associated with the call against a database of known IMS network numbers to verify that the caller number and callee numbers are legitimate.

5. The method of claim 4, further comprising:

forwarding the call by the first security server to the second security server upon determining that the call is not a malicious call, and otherwise dropping the call; and forwarding the call, by the second security server to the one or more billing servers, in response to verifying that the caller and callee number are legitimate.

6. The method of claim 2, wherein processing the verified call using the one or more billing servers comprises:

generating, by the CDR collection interface server in response to the call traversing through the CDR collection interface server, charging information for the call including a second CDR generated based on the verified call; and generating, by a billing and mediation server based on the charging information received from the CDR collection interface server, an entry in a customer's billing regarding the verified call.

7. The method of claim 6, wherein the CDR collection interface server is connected to the IMS network via a standard Rf or Ro interface, and further comprising:

receiving, by the CDR collection interface server from the IMS network, a third CDR for the call, and wherein the CDR collection interface generates the charging information as a function of the first CDR, the second CDR and the third CDR; and validating, by the billing and mediation server, the customer billing for accuracy and security based on the charging information including the first, second and third CDRs.

8. The method of claim 6, further comprising:

forwarding the verified call by the CDR collection interface server to the billing and mediation server upon generating the CDR; and forwarding the verified call, by the billing and mediation server to the security network SBC.

9. The method of claim 1, wherein the IMS network includes an SBC and a call processing and application server, and the method further comprising:

receiving, at the IMS network SBC, the outbound call from the first terminal device within the IMS network;

routing, by the IMS network session border controller, the call to the security network SBC.

10. A system for independent security verification and billing of calls in an IP Multimedia Core Network Subsystem (IMS), comprising:

an independent security network cloud connected to the IMS network via a secure communication connection, the security network including:

a session-border controller (SBC), wherein the network SBC is configured to receive an outbound call originating from a first terminal device of the IMS network and being directed to a second terminal device, store one or more call parameters for the call, and forward the call to one or more security servers within the security network;

one or more security servers configured to process the call to verify the security of the call;

one or more billing servers configured to generate billing data for the verified call and forward the verified call back to the security network SBC; and wherein the security network SBC is further configured to, in response to receipt of the verified call back from the one or more billing servers, transmit the call to the IMS network for routing the call to the second terminal device.

11. The system of claim 10, wherein the one or more billing servers includes a CDR collection interface server and a billing and mediation server, and wherein the security network SBC is configured to: generate a first CDR for the call in response to receipt of the call from the IMS network and send the first CDR to a CDR collection interface server over a secure Rf or Ro interface.

12. The system of claim 10, wherein the one or more security servers are configured verify the security of the call by implementing security checks within an IP network layer and an application layer for the call.

13. The system of claim 10, wherein the one or more security servers for verifying the security of the call comprise:

a first security server configured to analyze the call at an IP-layer against a defined database of IP-layer threat cases to determine whether the call is a malicious call; and a second security server configured to analyze a caller number and a callee number associated with the call against a database of known IMS network numbers to verify that the caller number and callee numbers are legitimate.

14. The system of claim 13,
wherein the first security server is configured to forward the call to the second security server upon determining that the call is not a malicious call, and otherwise drop the call; and
wherein the second security server is configured to forward the verified call to the one or more billing servers in response to verifying that the caller and callee number are legitimate.

15. The system of claim 11,
wherein, in response to receipt of the verified call, the CDR collection interface server is configured to generate charging information for the call including a second CDR generated based on the verified call, provide the charging information to the billing and mediation server and forward the verified call to the billing and mediation server; and
wherein the billing and mediation server is configured to generate an entry in a customer's billing regarding the verified call based on the charging information.

16. The system of claim 15,
wherein the CDR collection interface server configured to receive a third CDR for the call from the IMS network, and wherein the CDR collection interface generates the charging information as a function of the first CDR, the second CDR and the third CDR; and
wherein the billing and mediation server is further configured to validate the customer billing for accuracy and security based on the charging information including the first, second and third CDRs.

17. The system of claim 16, wherein the billing and mediation server is further configured to forward the verified call to the security network SBC.

18. The system of claim 10, further comprising:
an SBC provided within the IMS network, wherein the IMS network SBC is configured to receive the outbound call from the first terminal device within the IMS network and route the call to the security network SBC.

* * * * *